June 24, 1941.  S. PRZYBOROWSKI  2,247,132
METHOD OF AND MEANS FOR CONTROLLING THE EFFECTIVE
DEPTH OF IMMERSION BATHS
Filed Feb. 25, 1939
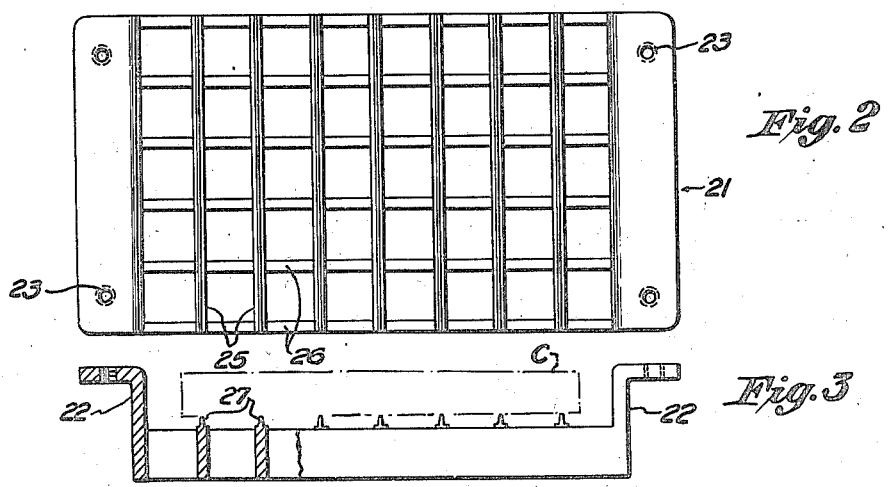
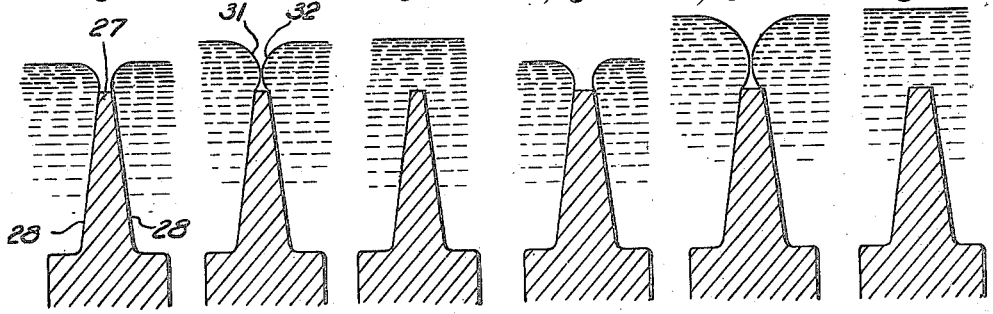
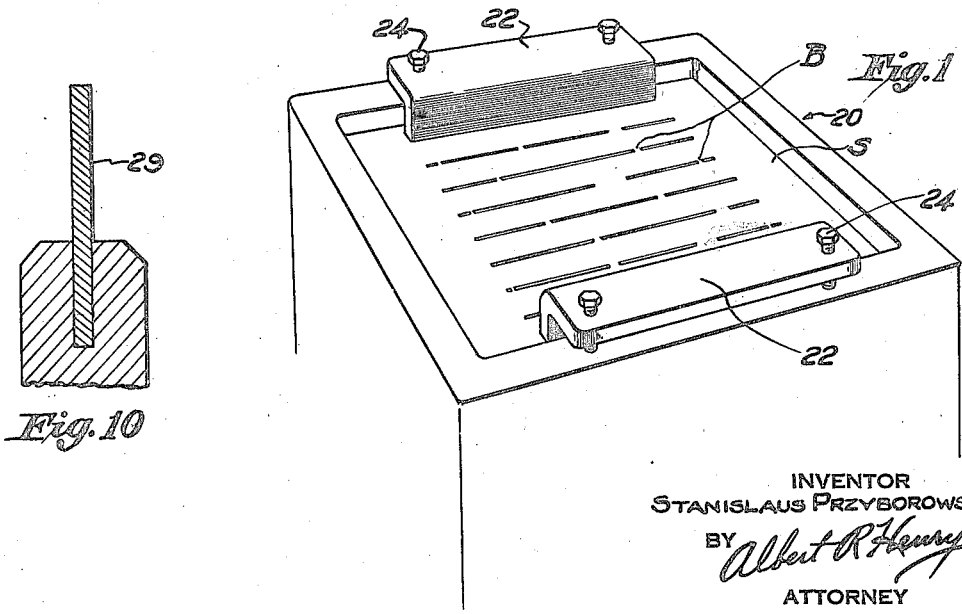
INVENTOR
STANISLAUS PRZYBOROWSKI
BY Albert R Henry
ATTORNEY Patented June 24, 1941

2,247,132

UNITED STATES PATENT OFFICE 2,247,132

METHOD OF AND MEANS FOR CONTROLLING THE EFFECTIVE DEPTH OF IMMERSION BATHS

Stanislaus Przyborowski, Tonawanda, N. Y., assignor to Fedders Manufacturing Company, Inc., Buffalo, N. Y.

Application February 25, 1939, Serial No. 258,537

2 Claims. (Cl. 113—111)

This invention relates to a method of and to means for controlling the effective depth of immersion baths, particularly solder baths into which radiator cores are face dipped to fill the core interstices by a capillary flow of molten solder.

Heretofore, in the manufacture of radiator cores, it has been customary to assemble a plurality of core elements and to dip the assembly, on first one face and then the other, into a bath of molten solder for a predetermined time interval,—the core, during the period of immersion, resting on a level grid work disposed below the surface of the bath. In my prior patent, No. 2,002,795, patented May 28, 1935, I have discussed this general procedure, and have more particularly dealt with the matter of insuring accurately determined times of immersion. As therein pointed out, when the core is dipped into the bath, molten solder flows by capillary action into the interstices between the core elements, thus bonding them into a rigid and water tight assembly.

In addition to the amount of solder taken up in the core interstices, and which performs a useful bonding function, there is a further quantity of solder which adheres to the walls of the cellular structure, particularly in the large air passages thereof, and this solder serves no advantageous purpose, but is essentially wasted. Obviously, the deeper the core is dipped, the more extensive will be this superfluous coating, and therefore the greater the loss. Accordingly, it has heretofore been the practice for the plant workmen to cover the grid work with solder until it was no longer visible, and to assume that such coverage represented the correct depth of immersion. As the bath became depleted, to expose the grid elements, more solder would be added.

When working with the grids available in the prior art, it has been repeatedly recognized that this practice gave what is known as a "heavy" dip,—that is, there would be an excessive amount of solder picked up by the core by adhesion, and there would be wide variances in the total weight of solder per core. As solder is an expensive material, these excesses have run to substantial figures in terms of cost. Due, however, to dross formations, it has heretofore been practically impossible to gauge the immersion depth to a greater degree of accuracy, such expedients as electric contact indicators and the like having been found unsatisfactory.

Despite these existing conditions, and the general view of the industry with respect to the inability of effecting a safe reduction in the depth of immersion, and hence the unavoidable loss of solder, I have discovered that such depth can be materially reduced, without sacrifice of effective bonding, but with better uniformity of solder application and substantial savings in total solder consumption. Generally speaking, and as hereinafter more fully explained, I achieve the primary purpose by an application of certain aspects of the principles of surface tension, particularly that aspect which, as I am advised, is known to physicists through Quincke's law of the bubble.

Generally speaking, if a drop of liquid be placed on a level surface which it will not wet,—as, for example, a drop of mercury on clean glass, the drop will tend to assume a spherical form, due to the action of surface tension, but that tendency will be overcome to a certain degree by the weight of the liquid itself, thus causing the drop or bubble to take an oval or generally ellipsoidal form. As more liquid is added to the original drop, its total height or thickness will increase up to a certain point, when the weight overcomes the surface tension, thus bursting the bubble and permitting it to flow until the height is reduced to the critical value, whereupon the bubble will regain a condition of equilibrium. This action of bubble formation, and spreading out, with the formation at the edge portions of an annular lobe, progressively continues, and is independent of the area of the bubble itself. As given by Poynting and Thomson, "Text Book of Physics—Properties of Matter," London, 1905, third edition, page 156, the force condition in a bubble at rest may be expressed by the equation:

$$T(1+\cos w) = 1/2 g d h^2$$

where $T$ is the force due to surface tension, $w$ is the angle of contact between the bubble and a contacting surface, $g$ is the force of gravity, $d$ the density of the material, and $h$ the effective height of the liquid layer.

It will appear from an inspection of this equation that the height depends upon the weight of the mass as balanced by the surface tension force $T$, which of course acts tangentially to the surface of the drop. Thus, if the surface of the bubble be displaced from its equilibrium curvature, an unbalanced force of surface tension is released, causing the bubble to break and spread out. For explanatory purposes, I may say that I employ this effect to provide continuous films of liquid solder whose height is less than that given by Quincke's equation, thereby establishing a depth of dip which is entirely sufficient for practical work, but less than that heretofore deemed necessary or obtainable.

Before discussing the foregoing principle to any greater extent, reference may be made to practical means for putting the invention into commercial use, illustrated in the accompanying drawing, wherein:

Fig. 1 is a perspective view of a solder tank in which is positioned a core supporting grid made according to the present invention;

Fig. 2 is a top view of the grid;

Fig. 3 is a section on the line 3—3 of Fig. 2;

Figs. 4, 5, and 6 are enlarged fragmentary sections on the line 4—4 of Fig. 2, showing bubble formation and dissolution adjacent the supporting edges of the grid;

Figs. 7, 8 and 9 are enlarged fragmentary views similar to Figs. 4 to 6, but showing the effect of increasing the width of the grid; and, Fig. 10 is an enlarged fragmentary section through a grid element formed with an inserted blade.

Referring first to Figs. 1, 2, and 3, there is illustrated a tank 20 adapted to contain a quantity of molten solder S, whose temperature and fluidity are carefully controlled in accordance with existing and well understood methods. Disposed in the bath S for immersion below its surface is a supporting grid 21 comprising a body having upstanding angular terminals 22 formed with tapped holes 23, which are adapted to receive supporting and leveling screws 24. The screws 24 bear on the walls of the tank 20, and, by suitable manipulation, the entire grid structure may be leveled accurately to bring it into precise parallelism with the liquid level of the solder S.

The body of the grid 21 is in the form of a cellular arrangement of transverse and longitudinal beams 25 and 26, the transverse beams having their upper edges projecting above the longitudinal beams, and having their supporting edges machined to form narrow blades or ribs 27 all lying in a common horizontal plane. It will be observed that the sides 28 of the ribs 27 are disposed at a small included angle, and that the narrow surfaces 27 constitute the bearing areas for the radiator core C which is to be dipped.

When the grid is properly leveled by adjustment of the screws 24, and the solder is brought up to cover the grid work, it will be apparent that a core C, placed on the ribs of the grid, will be uniformly immersed.

In Fig. 10, there is shown an alternative form of grid rib, in which the transverse beam 28 is provided with a narrow inserted blade 29. This structure has the advantage of permitting the economical use of special alloy steels having unique properties of low thermal expansion and resistance to erosion by the solder, thereby reducing the possibilities of warpage of the grid surface.

When molten solder is added to the bath S, it will, as it creeps up to and slightly above the edges of the ribs 27, form meniscuses which are curved upwardly, since the solder is non-wetting with respect to the grid. When the elevation of the solder above the grid level reaches a certain critical point, then of course the solder will flow freely over the grid face to cover it, and, in the prior art, this sudden bursting of the meniscuses formed on each side of the grid elements, and the flow of solder thereover, has been the index to the workman for determining the depth of immersion. However, as stated above, such method has neither been accurate, with regard to depth control, nor has it been satisfactory, because the range of depths so obtained has been greater than required for adequate solder flow into the core interstices, and has resulted in excessive solder consumption.

I now attribute this excessive depth formation to the condition that in the grids of the prior art, the depth of solder, prior to sudden coverage of the entire leveled grid structure, had exceeded the maximum value of $h$ as given in the equation set forth above.

That is to say, the workman would add solder to the pot up to a certain point, and, still seeing the exposed grid ribs between the spaced meniscuses formed on either side thereof, would add more solder which would bring the value of $h$ above its critical upper limit,—whereupon the solder bubbles would all suddenly break and the grid would thereupon be immersed to a depth of $h$ or greater.

I have discovered, however, that if the width of the supporting ribs 27 is reduced materially, so that the opposed meniscuses may contact before the maximum value of $h$ is obtained, then the grid surface is covered with substantial uniformity with a decreased, but sufficient, depth of solder, and accordingly the dipping action may take place with the stated economies of operation.

For example, suppose analysis of a satisfactory core shows that an immersion depth of say one-eighth inch, for a time interval of fifteen seconds, will suffice to produce the desired bonding of the core elements. This depth is less than that obtainable for a continuous solder surface, if the grid elements be made so wide that the full value of $h$ may be obtained before the bubbles burst. I therefore make the ribs 27 with a width of about three sixty-fourths of an inch, and there then develops the condition illustrated in Figs. 3 to 6 inclusive.

In Fig. 4, the solder as added to the pot has contacted the edges of the rib 28 and has formed opposed meniscuses above the surface of the blade 27. As more solder is added, the meniscuses approach each other,—the two opposed lobes 31, 32 being increased in extent as required by Quincke's law. As these meniscuses come into contact, they mutually deform each other, thereby creating an unstable condition in the surface tension force existing at the bubble surfaces, which force, for a condition of equilibrium, should be at right angles to the normal of the bubble whose shape is determined by the law.

The meniscuses are therefore more easily broken than they would be if this contact, before reaching the maximum value of $h$, had not taken place, and, when the continuous film is once formed, then of course it tends to remain in its continuous, or equilibrium, condition. A solder depth above the grid surface, which is substantially continuous but which is less than that heretofore obtainable, is accordingly established.

The breaking of the contacting meniscuses is, of course, preceded by an obscuring of the grid elements, whereas, in prior grids, there were visible lines of grid material up to the time the critical height was exceeded. It may also be noted that, when working according to the present invention, the approach to the depth for continuous surface formation is signalled by the occurrence of a series of small breaks, as indicated by the reference character B in Fig. 1. Thus, as the meniscuses approach each other, and come into contact, there will be a local break at one point, and then at another, and so on, until the solder surface will be continuous in several regions, but will be pitted with small holes or indentations where the meniscuses have not merged. When this condition occurs, the operator is advised that the slightest amount of added solder will be enough to raise the level to a point where the whole liquid surface will be converted into a truly continuous, as well as practically continuous film.

In Figs. 7 to 9 inclusive, a condition is illustrated in which the ribs 27 are slightly wider than assumed for the preceding example, so that a solder depth of say three-sixteenths of an inch may be obtained. Here again, however, the opposing meniscuses contact before the critical height is reached, and the depth control is accordingly obtained in the same manner.

Obviously, a condition might obtain, in using grids made according to the present invention, where some one or more spots would continue to show a breakage of the solder surface, and thus would indicate undesired deviations from the true horizontal of that portion of the grid, or an imperfection in the form of the grid. Since such a condition is readily detected, the indicated corrections may readily be made.

It is moreover apparent that a set of grids, having different bearing area widths, may be made available for interchange on each dipping tank for conditions wherein different depths of immersion are desired. Or, it may be assumed that some of the surfaces 27 are located at an auxiliary point, and the width of the surface progressively varies. By observing the formation and point of bursting of contacting meniscuses along such width, the operator may increase under control the depth of immersion above that value determined by the width of the supporting ribs themselves.

I have discussed the control of the depth, to obtain immersion values lower than those heretofore obtainable, from the viewpoint of Quincke's law, inasmuch as this law offers a satisfactory explanation of the action. If we regard the lobar portion of the liquid formed by the meniscus as the margin of a solder bubble floating on solder, then it is clear that the width of the lobar portion will have a maximum value, which is dependent upon the height. Any condition which prevents the lobar portion from assuming its equilibrium contour accordingly breaks the bubble, and permits flow and the formation of a continuous surface. Accordingly, it may be said that one measure of the present invention is that the width of the rib 27 should not exceed twice the maximum lobar width of the bubble, for otherwise the meniscuses could not contact before the maximum value of $h$, in Quincke's equation, obtained. While more extensive reference could be made to theory and observed results relating to surface tension actions in films, the foregoing is deemed adequate to explain the principle by which lower immersion depths, over continuous surfaces, may be obtained.

As the cores are dipped into the solder bath, the bath of course becomes depleted and requires replenishing. Again, when working according to the present invention, a more accurate control may be obtained. Thus, each core, as it emerges from the bath, creates a certain disturbance in the liquid surface, and, as less separation is now required to effect the reformation of bubbles whose meniscuses contact the rib edges, there will be a reformation of the breaks or pits in the liquid surface. Since the level has been, at all times, below the maximum height as determined by Quincke's law, the conditions are favorable for the force of surface tension to take precedence over the force of gravity tending to spread the solder, and accordingly the application of the law in practice provides a low level, as well as a high level control. When filling the bath, the dissolution of the meniscuses, coextensive with the lines of the grids, determines the upper limit, while when depleting the bath, the reformation of the full meniscuses indicates that more solder should be added. These two limits are very close together, as dimensions may be measured, and while the condition will of course require more frequent replenishments of the bath, this is more than compensated for by the uniformity of solder consumption, and the savings effected. With the wide grids of the prior art, diminution of the solder depth below the critical value of $h$ of course resulted in long lines of separation, since the lobes of the spaced bubbles were out of contact, and thus significantly interrupted the continuity of the film.

While I have described my invention by reference to certain specific embodiments and with respect to one industrial application, and have endeavored to distinguish it from prior knowledge by discussion of the physical phenomenon deemed pertinent thereto, it will be understood that this description is to be deemed explanatory, and not limiting, and accordingly it is intended to encompass within the scope of the invention all such modifications or geometrical forms and applications as are within the purview of the following claims.

I claim:

1. In the face dipping of radiator cores in baths of molten solder with absorption of solder by capillary action into the interstices of the core, the method of establishing and maintaining a controlled depth of dip for the cores which comprises positioning a level grid below the surface of the solder for reception and support of the cores, adding solder to a height greater than the supporting level of the grid thereby causing meniscuses to form between the solder and the grid, and contacting and merging the meniscuses before they obtain a maximum height of a bubble of the solder as measured by Quincke's law, thereby to spread the solder into a substantially continuous film over the grid surface.

2. Soldering equipment including a tank holding a body of molten solder, a supporting grid in the tank, and means for positioning the supporting portion of the grid in a horizontal plane below the solder surface, said supporting portion comprising a plurality of ribs having upper supporting surfaces each of a width such that, as solder is added to submerge said ribs, the meniscuses formed on opposite sides thereof may contact over said upper supporting surfaces and merge before there is a free flow of solder in either direction from either of said meniscuses.

STANISLAUS PRZYBOROWSKI.